US 7,856,500 B2

(12) United States Patent
Dasgupta et al.

(10) Patent No.: US 7,856,500 B2
(45) Date of Patent: Dec. 21, 2010

(54) METHOD FOR PLACING COMPOSITE APPLICATIONS IN A FEDERATED ENVIRONMENT

(75) Inventors: Gargi B. Dasgupta, Gurgaon (IN); Ajay Mohindra, Yorktown Heights, NY (US); Anindya Neogi, New Delhi (IN); Akshat Verma, New Delhi (IN); Balaji Viswanathan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/171,741

(22) Filed: Jul. 11, 2008

(65) Prior Publication Data

US 2010/0011102 A1    Jan. 14, 2010

(51) Int. Cl.
*G06F 15/173* (2006.01)
(52) U.S. Cl. ...................................... 709/226
(58) Field of Classification Search ............. 709/226; 718/105
See application file for complete search history.

(56) References Cited

U.S. PATENT DOCUMENTS

| 5,918,017 | A * | 6/1999 | Attanasio et al. | 709/224 |
|---|---|---|---|---|
| 6,496,866 | B2 * | 12/2002 | Attanasio et al. | 709/239 |
| 6,910,154 | B1 * | 6/2005 | Schoenthal | 714/18 |
| 7,200,657 | B2 | 4/2007 | Adams et al. | |
| 7,388,839 | B2 * | 6/2008 | Chafle et al. | 370/236 |
| 7,516,221 | B2 * | 4/2009 | Souder et al. | 709/226 |
| 7,533,385 | B1 * | 5/2009 | Barnes | 718/104 |
| 7,593,968 | B2 * | 9/2009 | Beck | 707/201 |
| 7,664,847 | B2 * | 2/2010 | Colrain et al. | 709/224 |
| 2003/0126202 | A1 | 7/2003 | Watt | |
| 2006/0021019 | A1 | 1/2006 | Hinton et al. | |
| 2006/0265499 | A1 | 11/2006 | Menasce et al. | |
| 2006/0294238 | A1 | 12/2006 | Naik et al. | |

OTHER PUBLICATIONS

Vassiliadis et al. Application Service Provision through the Grid: Business models and Architectures. Proceedings of the International Conference on Information Technology: Coding and Computing (ITCC '04).

Li et al. Services Ecosystem: Towards a Resilient Infrastructure for On Demand Services Provisioning in Grid. International Conference on Web Services 2004, Jul. 2004, San Diego, CA.

Watson et al. Dynamically Deploying Web Services on a Grid using Dynasoar, In Proceedings of the Ninth IEEE International Symposium on Object and Component-Oriented Real-Time Distributed Computing, ISORC 2006.

(Continued)

*Primary Examiner*—David Y Eng
(74) *Attorney, Agent, or Firm*—Ryan, Mason & Lewis, LLP

(57) ABSTRACT

Techniques for placing at least one composite application in a federated environment are provided. The techniques include analyzing a composite application to be deployed in a federated environment, obtaining one or more application artifacts, analyzing feasibility of placing one or more application components at one or more clusters in the federated environment without knowledge of resource availability at each of the one or more clusters, and generating a mapping of the one or more application components to the one or more clusters such that an application requirement is met, wherein the one or more application artifacts are distributed across a federated environment.

20 Claims, 5 Drawing Sheets

OTHER PUBLICATIONS

Yeo et al. Service Level Agreement based Allocation of Cluster Resources: Handling Penalty to Enhance Utility. The University of Melbourne, Australia.

Naik et al. On-line Evolutionary Resource Matching for Job Scheduling in Heterogeneous Grid Environments, Proceedings of the 12th International Conference on Parallel and Distributed Systems (ICPADS '06).

Topcuoglu et al. Performance-effective and low-complexity task scheduling for heterogeneous computing. IEEE Transactions on Parallel and Distributed Systems, vol. 13, No. 3, Mar. 2002.

MacLaren et al. Towards service based scheduling in the grid. http://www.isl.edu/ikcap/icaps04-workshop/final/maclaren.pdf., American Association for Artificial Intelligence, 2004.

* cited by examiner

METHOD FOR PLACING COMPOSITE APPLICATIONS IN A FEDERATED ENVIRONMENT

FIELD OF THE INVENTION

The present invention generally relates to information technology, and, more particularly, to composite applications.

BACKGROUND OF THE INVENTION

Composite applications that run in a federated environment advantageously need to be mapped to the resources available at different sites. A composite application includes one or more components that work together to provide a service. As such, composite applications 1 to N should advantageously be mapped to heterogeneous server clusters 1 to M. Additionally, clusters can connect to a federation. However, clusters cannot share the details of their resources, as they belong to different administrative domains.

Minimum information sharing also helps to scale up provisioning logic. Additionally, applications should advantageously be placed on the clusters using a federated provisioning module. Applications can specify one or more requirements such as, for example, performance targets (for example, less than 10 milli-second response time), availability targets (for example, 99.9% up-time, mean time to recovery (MTTR), mean time between failures (MTBF)), and required resource capacity (such as, for example, central processing unit (CPU), memory size, etc.).

Clusters cannot be requested to declare any information that reveals actual resources held by them. As such, a provisioning problem exists in computing the number of replicas for each application component and a target server cluster for each replica to satisfy application requirements and/or minimize the cost of application hosting. Additionally, the objective specified by the Federated Service Provider should also advantageously be met (for example, load balance, and all clusters operating at a load factor such that the total cost of running the clusters as determined by cost-load curves for each site is minimized).

In existing approaches, composite application placement is not addressed, nor is there joint optimization of system and client objectives. Also, existing approaches do not apply to multi-component services on a federated domain, and do not address resource information hiding or availability requirements.

SUMMARY OF THE INVENTION

Principles of the present invention provide techniques for placing composite applications in a federated and/or distributed environment. An exemplary method (which may be computer-implemented) for placing at least one composite application in a federated environment, according to one aspect of the invention, can include steps of analyzing a composite application to be deployed in a federated environment, obtaining one or more application artifacts, analyzing feasibility of placing one or more application components at one or more clusters in the federated environment without knowledge of resource availability at each of the one or more clusters, and generating a mapping of the one or more application components to the one or more clusters such that an application requirement is met, wherein the one or more application artifacts are distributed across a federated environment.

At least one embodiment of the invention can be implemented in the form of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
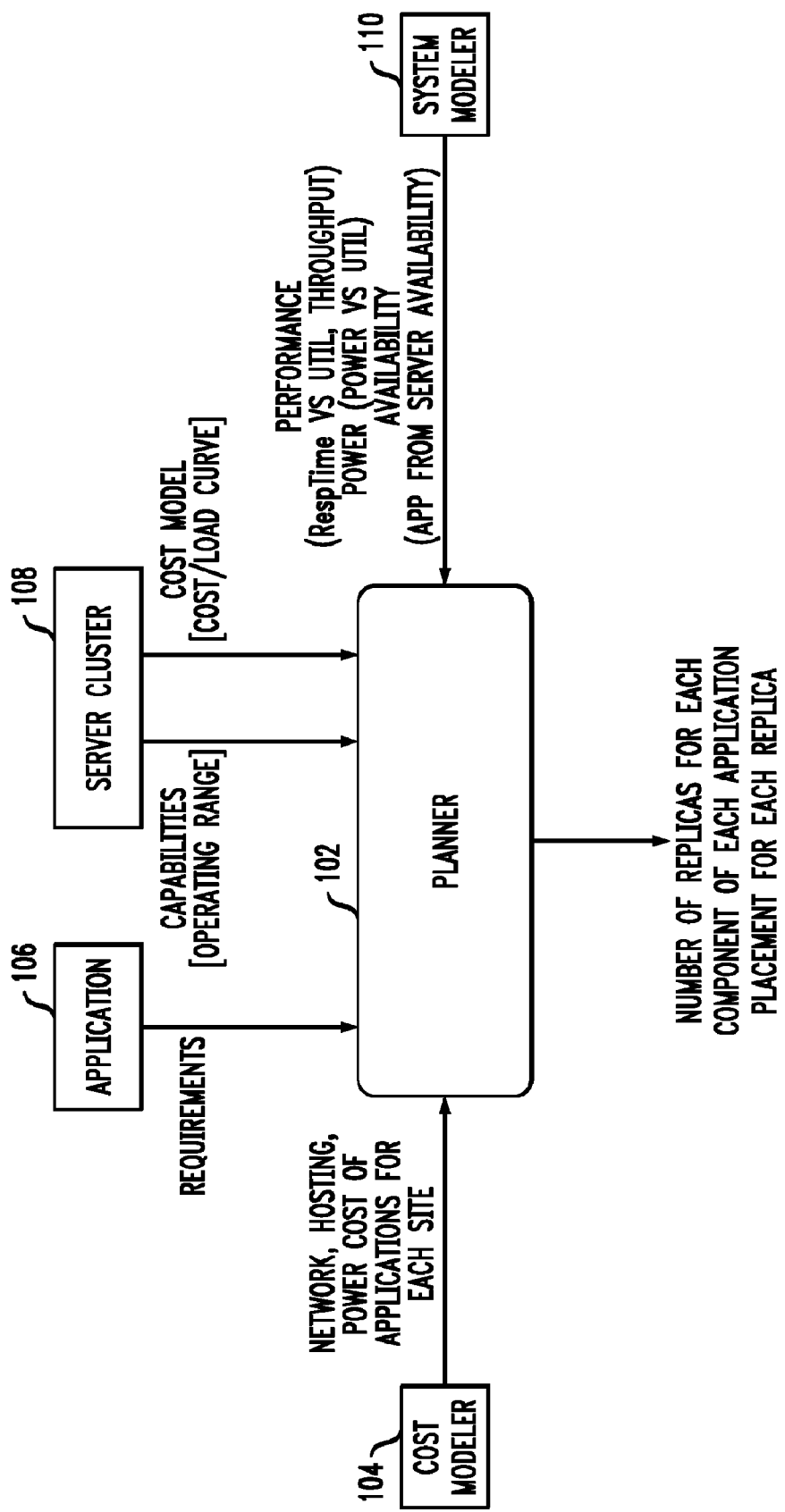
FIG. 1 is a diagram illustrating functional flow of a planner, according to an embodiment of the present invention.

Principles of the present invention include provisioning of composite applications in federated and distributed environments. Additionally, in contrast to the disadvantageous existing approaches noted above, one or more embodiments of the invention include analyzing available resources in a distributed environment without the knowledge of resource availability at individual sites, as well as application provisioning that does not require individual cluster resource availability sharing.

The techniques described herein also include, for example, placement of composite applications in a federation, information hiding, and joint handling of system and application objectives. Further, one or more embodiments of the present invention include application provisioning on federated server clusters, where multi-component applications need to be placed on domains. Placement criterion can be derived, for example, from quality of service (QoS) or from cost.

In one or more embodiments of the invention, cost, availability and performance models of individual domains can be exchanged. Applications can express their requirements in three dimensions of cost, availability and performance. Performance and availability guarantees required by application and system costs can also be considered while deciding on placement.

One or more embodiments of the present invention that include a local-model design that further includes a centralized planner, and a cost modeler and system modeler that are local to each server cluster. Given an application component, the modelers return a supported operating range along with the cost. The server clusters can also specify a cluster operating point either through a cost-load function or a desired load factor. A planner can use, for example, a question-and-answer methodology to identify candidate solutions such that application-service level agreements (-SLAs) are met. Also, a planner uses an optimization algorithm to ensure that the applications are run on sites that ensure minimum cost while running the sites on the desired load factor.

Additionally, one or more embodiments of the invention can include an optimizer. An optimizer takes, as an input, a set of application $A\_i$ and the set of candidate solutions $S\_i$ for each application component that can meet its QoS goals. $A\_i$s denotes the ith application and $S\_i$ denotes a set containing all solutions that can host the application. Note that not every candidate solution in the set S_i denotes a target server, but is a set of mappings of application components to target servers. For example, an entry in S_i can include {(C1, SC1), (C1, SC2), (C2, SC4)}, which denotes that the component C1 has two replicas that are places on the clusters SC1 and SC2, whereas the component C2 is placed on cluster SC4.

The optimizer creates an initial feasible placement that is biased towards the application and minimizes the cost of the applications. It can also improve the placement in a way that optimizes the tradeoff between the objectives of the application provider and service provider.

In one or more embodiments of the invention, one can compute the following initial placement. For each application, one can select a candidate solution such that the total cost incurred by the application is minimized, that is, application $A\_i$ uses solution $L\_k \in S\_i$ such that $C\_{i,k} = \min C\_{i,j} L j \in S\_i$ and $L\_k$ can meet the QoS goals of $A\_i$. This leads to an initial placement metric $X=\{(A\_1, L\_1), \ldots, (A\_i, L\_i), \ldots (A\_N, L\_N)\}$ where $L\_i$ is the least cost solution for application $A\_i$. However, this placement may have huge imbalances in load.

As such, one can correct the load imbalance in the following manner. For each application and any other feasible solution for it, ($A\_i, L\_j$), $L\_j \in S\_i$, one can compute the goodness of movement which is defined as the improvement in the objective function by moving $A\_i$ to $L\_j$ from the placement $L\_i$ given by X. One can then iteratively select the movement that leads to the highest improvement in objective function and terminate when the desired load factor is achieved. A typical objective function is, for example, an increase in load balance per unit increase in total application cost, but one or more embodiments of the invention cover all possible objective functions.

One or more embodiments of the present invention also include availability modeling. Because availability numbers are difficult to obtain experimentally (the measurement windows required would be impractical), one can use an analytical model for application availability. Application availability can be determined as a function of site availability and link availability where the function is based on the following two thumb rules. First, replicas lead to a multiplication of the non-availability (inverse of the mean time between failures (MTBF)) of an application. Also, the dependence on one more sites or links for a replica leads to a multiplicative term in the availability (1-1/MTBF) and an additive term in the mean time to recover (MTTR). The techniques described herein also allow an application to explicitly specify the number of replicas and the site and link availability metrics for each replica to deal with scenarios where modeling application availability from site and link availability may be difficult.

One or more embodiments of the invention also include power modeling. One can use a measurement-based methodology to create power models for each site and application pair. The power model for an application on a site is created separately for each application and site pair, and is synthesized by running the application at various load-points on each site. The resultant power drawn by the resources that are used by the application is measured and the model is created by fitting a piece-wise linear function of power with an application load for each site.

The techniques described herein can also include performance modeling, which is created using a mix of measurements and expert information. The performance model can use third-party models that map response time to utilization for various classes of applications (for example, sequential input/output intensive workloads use the disk knee curve). This substantially reduces the learning time for the model, and is especially true because performance depends not only on the throughput of the given application but also on the other applications running on the site. As such, in order to create a performance model for an application, one would need to measure its performance when mixed with various other applications as well. The use of third-party models, if available, allows one to quickly converge to a reasonable performance model for each application.

As described herein, one or more embodiments of the invention advantageously provision service within a geographically distributed enterprise with multiple administrative domains. Additionally, the techniques described herein promote integrated resource pools, as well as consolidation and efficient resource usage across the organization (for example, a globally integrated enterprise (GIE), global service delivery, etc.). One or more embodiments of the invention also include a platform for composite software as a service (SaaS) applications that can integrate and host services provided by external entities or across multiple geographically distributed administrative domains. Further, the techniques described herein can include a federated independent software vendor (ISV) testing platform.

FIG. 1 is a diagram illustrating functional flow of a planner, according to an embodiment of the present invention. By way of illustration, FIG. 1 depicts the elements of a planner 102, a cost modeler 104, an application 106, a server cluster 108 and a system modeler 110. As illustrated in FIG. 1, the cost modeler 104 provides information to the planner 102 such as, for example, network, hosting, power cost of applications for each site, etc. Also, application 106 provides requirement information to the planner 102, and server cluster 108 provides information to the planner 102 such as capabilities (for example, operating range) and a cost model (for example a cost/load curve). System modeler 110 provides performance, power and availability information to the planner 102, and the planner 102 outputs the number of replicas for each component of each application and placement for each replica.

Figure 2:
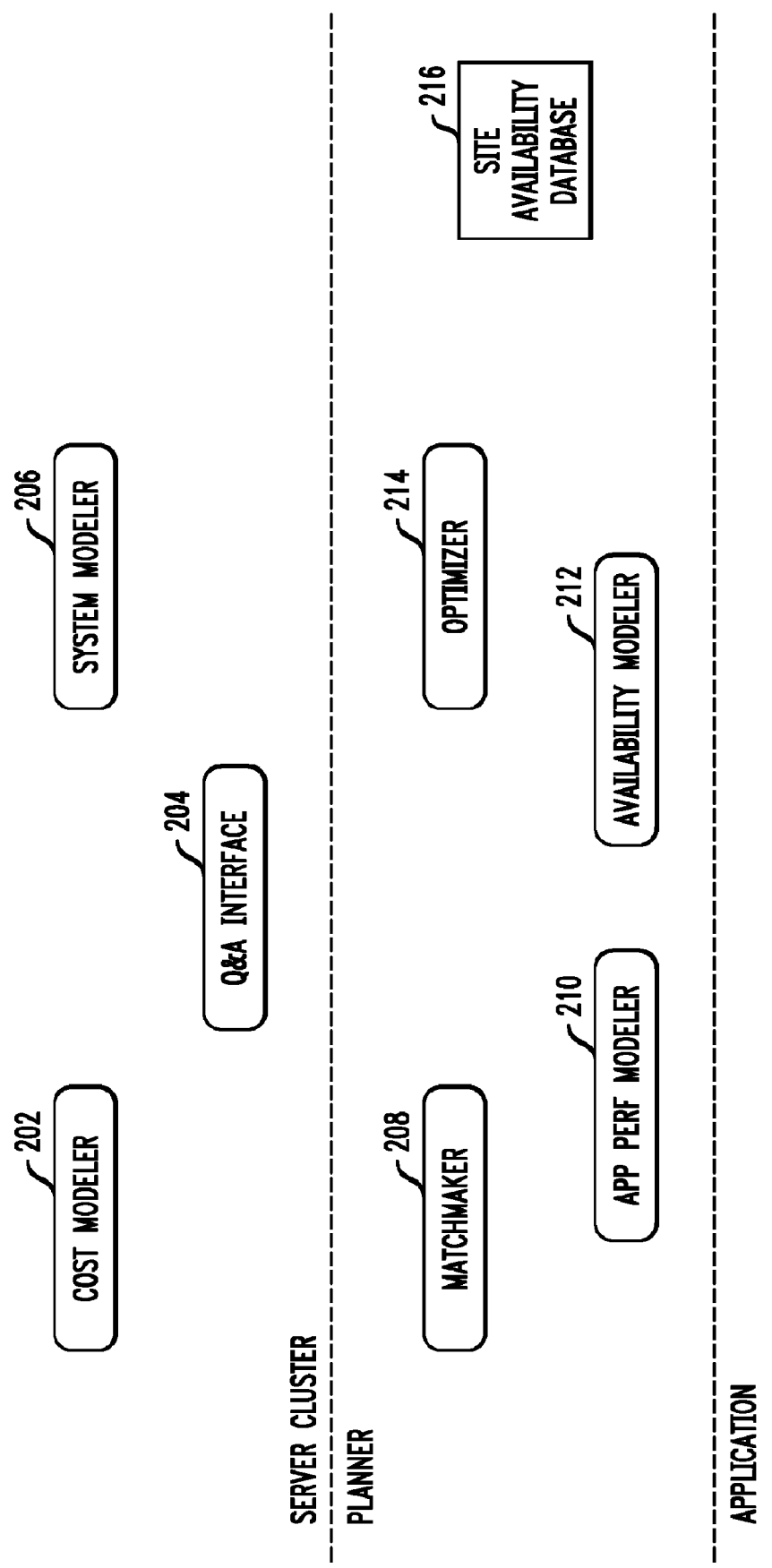
FIG. 2 is a diagram illustrating functional blocks, according to an embodiment of the present invention.

FIG. 2 is a diagram illustrating functional blocks, according to an embodiment of the present invention. By way of illustration, FIG. 2 depicts a server cluster, a planner and an application. The server cluster includes the elements of a cost modeler 202, a question and answer (Q & A) interface 204 and a system modeler 206. The planner includes the elements of a matchmaker 208, an application performance (App. Perf.) modeler 210, an availability modeler 212, an optimizer 214 and a site availability database 216.

Figure 3:
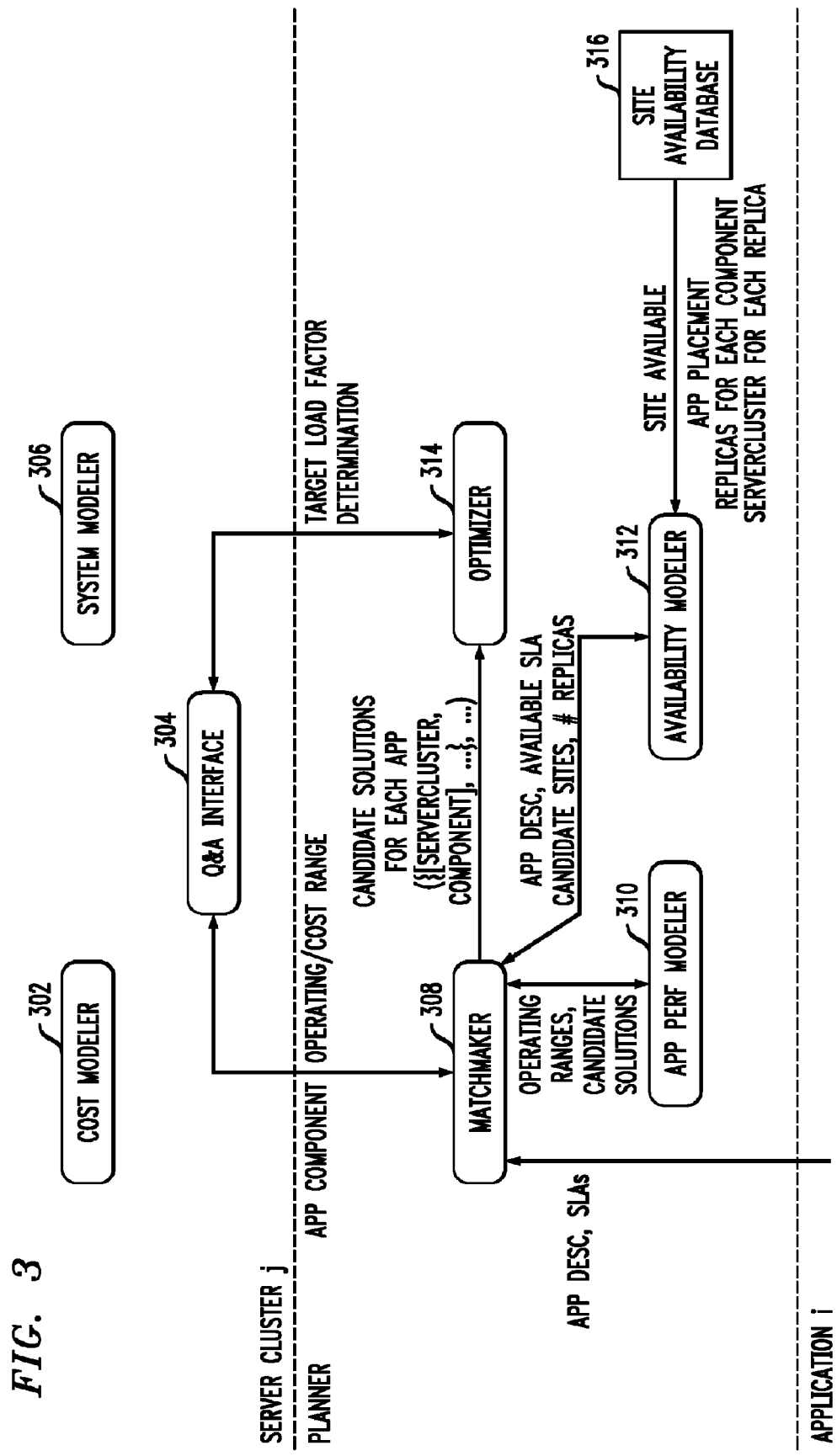
FIG. 3 is a diagram illustrating high level flow, according to an embodiment of the present invention.

FIG. 3 is a diagram illustrating high level flow, according to an embodiment of the present invention. By way of illustration, FIG. 3 depicts a server cluster j, a planner and an application i. The server cluster j includes the elements of a cost modeler 302, a question and answer (Q & A) interface 304 and a system modeler 306. The planner includes the elements of a matchmaker 308, an application performance (App. Perf.) modeler 310, an availability modeler 312, an optimizer 314 and a site availability database 316.

As illustrated in FIG. 3, a number of steps are depicted. For example, application descriptions and SLAs are provided to the matchmaker 308, and then sent to the availability modeler 312. Candidate sites and the number of replicas are sent from the availability modeler 312 to the matchmaker 308. An application component is sent from the matchmaker 308 to the Q & A interface 304, while the operating cost and/or range is sent from the Q & A interface 304 back to the matchmaker 308. The matchmaker 308 sends the operating ranges to the application performance modeler 310, which then sends candidate solutions back to the matchmaker 308.

The matchmaker then sends the candidate solutions for each application (for example, {[servercluster, component], . . . } . . . ) to the optimizer 314, which exchanges the target load factor determination with the Q & A interface 304. Also, application placement replicas for each component and a server cluster for each replica are sent from the site availability database 316 to the availability modeler 312. Further, a final output is generated from the planner.

Figure 4:
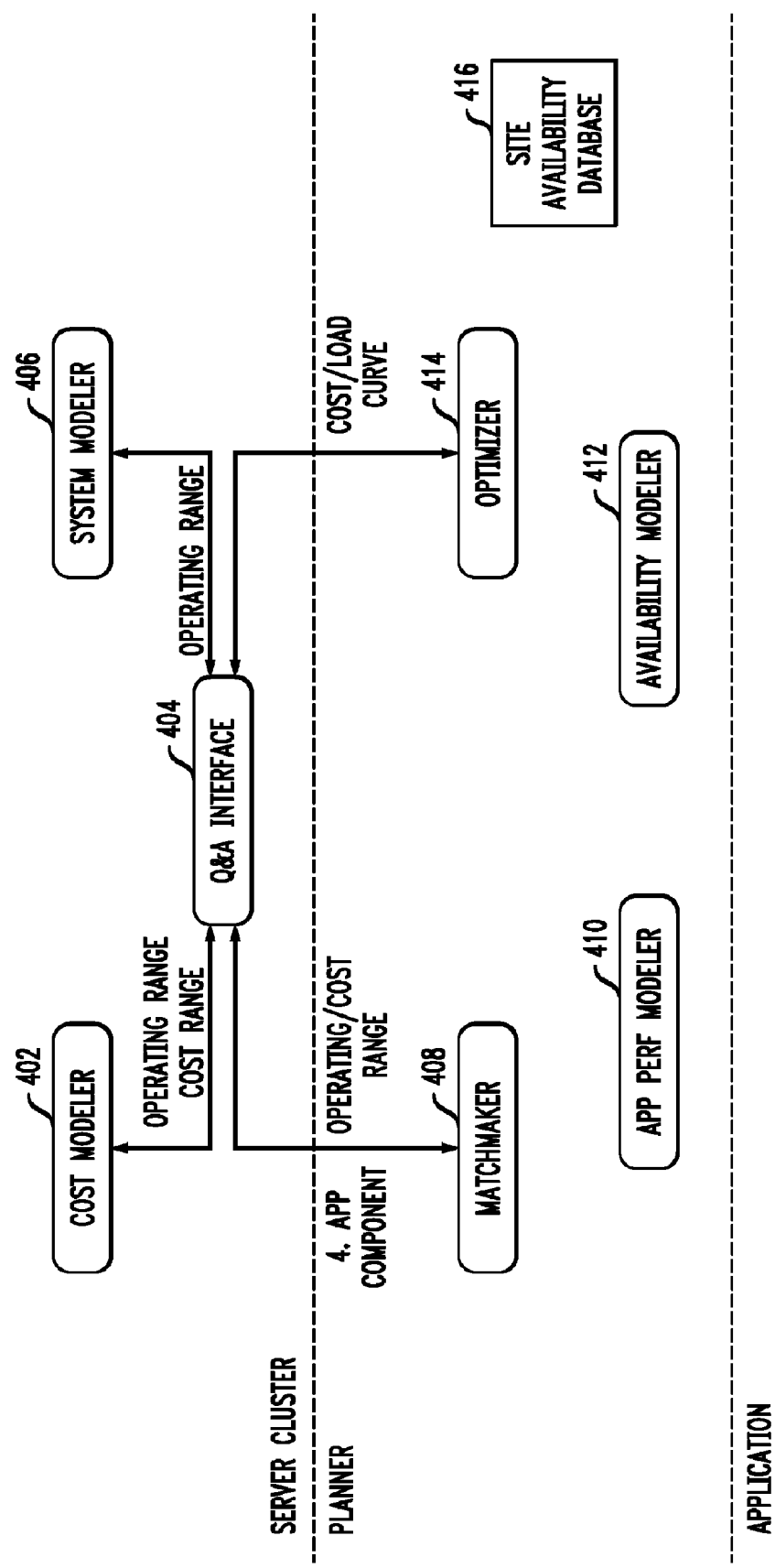
FIG. 4 is a diagram illustrating server cluster flow, according to an embodiment of the present invention.

FIG. 4 is a diagram illustrating the interactions between the server cluster and the planner, according to an embodiment of the present invention. By way of illustration, FIG. 4 depicts a server cluster, a planner and an application. The server cluster includes the elements of a cost modeler 402, a question and answer (Q & A) interface 404 and a system modeler 406. The planner includes the elements of a matchmaker 408, an application performance (App. Perf.) modeler 410, an availability modeler 412, an optimizer 414 and a site availability database 416.

As illustrated in FIG. 4, in the first interaction, the matchmaker 408 queries the Q & A interface 404 for the operating and cost range supported by a given application component. As such, the characteristics of the application component are passed to the Q & A interface 404. The Q & A interface 404 queries the system modeler 406 for the operating range that can be supported for the provided application component. Once the Q & A interface 404 receives the operating range, it queries the cost modeler 402 for the cost range corresponding to the given operating range. Once the Q & A interface 404 receives the corresponding cost range, it returns the cost range and the operating range to the matchmaker 408. In the second interaction between the planner and the server cluster, a cost/load curve is exchanged between the Q & A interface 404 and the optimizer 414.

Figure 5:
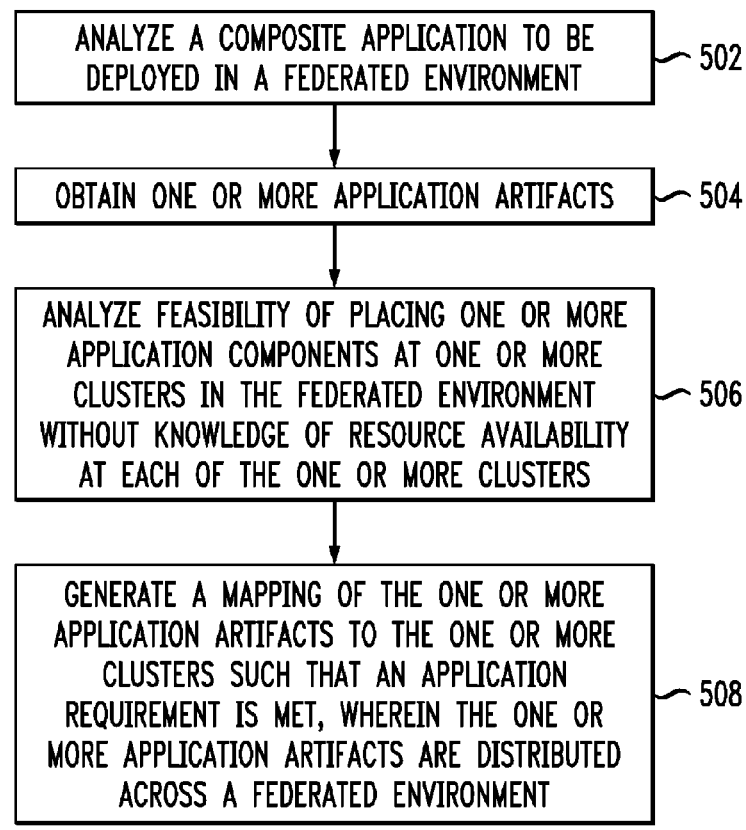
FIG. 5 is a flow diagram illustrating techniques for placing at least one composite application in a federated environment, according to an embodiment of the present invention.

FIG. 5 is a flow diagram illustrating techniques for placing at least one composite application (for example, software that provides a service) in a federated and/or distributed environment, according to an embodiment of the present invention. Step 502 includes analyzing a composite application (for example, at least one multi-component application) to be deployed in a federated environment. Step 504 includes obtaining one or more application artifacts. Step 506 includes analyzing feasibility of placing one or more application components at one or more clusters in the federated environment without knowledge of resource availability at each of the one or more clusters.

Step 508 includes generating a mapping of the one or more application artifacts to the one or more clusters such that an application requirement (for example, a service level agreement (SLA) and/or one or more SLA goals) is met, wherein the one or more application artifacts are distributed across a federated environment (for example, a set of server clusters that have independent administrators). Application requirements can also include, for example, infrastructure level parameters (such as, for example, central processing unit (CPU), memory, storage capacity, etc.). The mapping can preferably meet one or more application objectives and one or more server cluster objectives.

Also, the server clusters do not share any details on actual resources held by the respective administration domains. Further, one or more SLA goals can include a performance model and/or application availability. Application availability can be automatically inferred from site and link availability. Link and cluster availability is public information.

The performance model can be derived using a mixed-methodology, wherein a mixed-methodology includes using a mix of measurements and expert information, and wherein the measurements include, for example, third-party models that map response time to utilization for one or more classes of applications (for example, sequential input/output intensive workloads use the disk knee curve). Performance is private to each cluster.

A tradeoff between application objectives and server cluster objectives can be met flexibly. Additionally, application objectives can include minimizing application cost, wherein application cost includes a power cost (where a measurement-based methodology is used to estimate power costs), a network cost and/or a hosting cost.

A multi-component application, as noted above, can include at least one application wherein a number of replicas of each component vary based on a selected server cluster as a candidate solution.

The techniques depicted in FIG. 5 can also include, for each of one or more components of the composite application, selecting the cheapest solution, improving a component with a highest increase in service level agreement (SLA) goal per unit increase in cost, and iterating until each of one or more SLA goals is met (for example, multiple SLA goals can be handled by considering a distance function).

Additionally, one or more embodiments of the present invention include computing the following initial placement. For each application, one can select a candidate solution such that the total cost incurred by the application is minimized, that is, application $A_i$ uses solution $L_k$ such that $C_{i,k}=\min C_{i,j} \; j=\{1,M\}$ and $L_k$ can meet the QoS goals of $A_i$. This leads to an initial placement metric X. However, this placement may have imbalances in load. As such, one can correct the load imbalance in the following manner. For each application, solution pair ($A_i, L_j$), one can compute the goodness of movement, which is defined as the improvement in the objective function, by moving $A_i$ to $L_j$ from the placement given by X. One can then iteratively select the movement that leads to the highest improvement in objective function and terminate when the desired load factor is achieved. A typical objective function, for example, is increase in load balance per unit increase in total application cost, but the techniques described herein cover all possible objective functions.

Further, the techniques depicted in FIG. 5 can also include selecting an initial feasible solution with a lowest cost and one or more load imbalances, computing a quality of each movement, selecting a movement with a highest improvement, and repeating the selecting, computing and selecting steps until a desired load factor is met for each of the one or more clusters.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
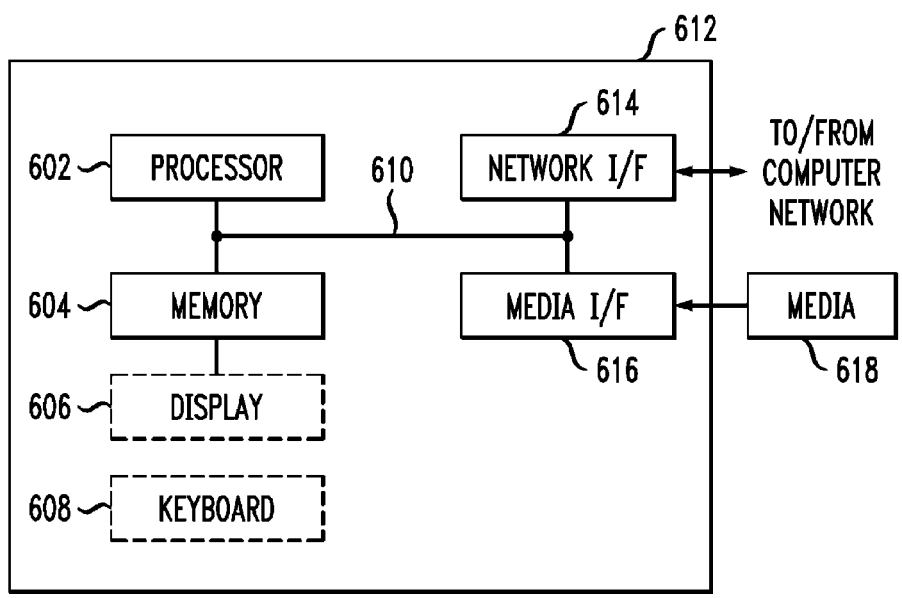
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, analyzing available resources in a distributed environment without the knowledge of resource availability at individual sites.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for placing at least one composite application in a federated environment, comprising the steps of:
analyzing a composite application to be deployed in a federated environment to determine requirements of said composite application;
obtaining one or more application artifacts;
analyzing feasibility of placing one or more application components at one or more clusters in the federated environment without knowledge of resource availability at each of the one or more clusters; and
generating a mapping of the one or more application artifacts to the one or more clusters such that said composite application requirement is met, wherein the one or more application artifacts are distributed across a federated environment.

2. The method of claim 1, wherein the mapping meets one or more application objectives and one or more server cluster objectives.

3. The method of claim 2, wherein a tradeoff between the one or more application objectives and the one or more server cluster objectives is met flexibly.

4. The method of claim 2, wherein the one or more application objectives comprise minimizing application cost, wherein application cost comprises at least one or a power cost, a network cost and a hosting cost.

5. The method of claim 1, wherein the at least one application comprises at least one multi-component application.

6. The method of claim 5, wherein the at least one multi-component application comprise at least one application wherein a number of replicas of each component varies based on a selected server cluster as a candidate solution.

7. The method of claim 1, wherein the application requirement comprises one or more SLA goals.

8. The method of claim 7, wherein the one or more SLA goals comprise at least one of a performance model and application availability.

9. The method of claim 8, wherein application availability is automatically inferred from site and link availability.

10. The method of claim 8, wherein the performance model is derived using a mixed-methodology, wherein the mixed-methodology comprises using a mix of one or more measurements and expert information, wherein the one or more measurements comprise one or more third-party models that map response time to utilization for one or more classes of applications.

11. The method of claim 1, wherein the application requirements comprise one or more infrastructure level parameters.

12. The method of claim 1, further comprising, for each of one or more components of the composite application:
   selecting the cheapest solution;
   improving a component with a highest increase in service level agreement (SLA) goal per unit increase in cost; and
   iterating until each of one or more SLA goals is met.

13. The method of claim 1, further comprising:
   selecting an initial feasible solution with a lowest cost and one or more load imbalances;
   computing a quality of each movement;
   selecting a movement with a highest improvement; and
   repeating the selecting, computing and selecting steps until a desired load factor is met for each of the one or more clusters.

14. An article of manufacture comprising a computer readable medium having computer readable program code which when executed by a computer, places at least one composite application in a federated environment, said article of manufacture including:
   computer readable program code for analyzing a composite application to be deployed in a federated environment to determine requirements of said composite application;
   computer readable program code for obtaining one or more application artifacts;
   computer readable program code for analyzing one or more available resources in the federated environment without knowledge of resource availability at each of one or more individual sites; and
   computer readable program code for generating a mapping of the one or more application artifacts to the one or more available resources such that an said composite application requirement is met, wherein the one or more application artifacts are distributed across a federated environment.

15. The article of manufacture of claim 14, further comprising, for each of one or more components of the composite application:
   computer readable program code for selecting the cheapest solution;
   computer readable program code for improving a component with a highest increase in service level agreement (SLA) goal per unit increase in cost; and
   computer readable program code for iterating until each of one or more SLA goals is met.

16. A system for placing at least one composite application in a federated environment, comprising:
   a memory;
   at least one processor coupled to said memory and
   a computer readable medium having computer readable program code embodied thereon which when loaded into said memory causes said at least one processor to:
     analyze a composite application to be deployed in a federated environment to determine requirements of said composite application;
     obtain one or more application artifacts;
     analyze one or more available resources in the federated environment without knowledge of resource availability at each of one or more individual sites; and
     generate a mapping of the one or more application artifacts to the one or more available resources such that said composite application requirement is met, wherein the one or more application artifacts are distributed across a federated environment.

17. The system of claim 16, wherein the at least one application comprises at least one multi-component application.

18. The system of claim 16, wherein in generating a mapping, the computer readable medium further comprises computer readable program code embodied thereon which when loaded into said memory causes said at least one processor to generate a mapping, wherein the mapping meets one or more application objectives and one or more server cluster objectives.

19. The system of claim 16, wherein the computer readable medium further comprises computer readable program code embodied thereon which when loaded into said memory causes said at least one processor to, for each of one or more components of the composite application:
   select the cheapest solution;
   improve a component with a highest increase in service level agreement (SLA) goal per unit increase in cost; and
   iterate until each of one or more SLA goals is met.

20. The system of claim 16, wherein the computer readable medium further comprises computer readable program code embodied thereon which when loaded into said memory causes said at least one processor to:
   select an initial feasible solution with a lowest cost and one or more load imbalances;
   compute a quality of each movement;
   select a movement with a highest improvement; and
   repeat the selecting, computing and selecting steps until a desired load factor is met for each of the one or more clusters.

* * * * *